United States Patent
Noweihed

(10) Patent No.: US 10,252,569 B2
(45) Date of Patent: Apr. 9, 2019

(54) MOTOR VEHICLE WHEEL

(71) Applicant: Ford Global Technologies, LLC, Dearborn, MI (US)

(72) Inventor: Bassam Noweihed, Duesseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 15/011,514

(22) Filed: Jan. 30, 2016

(65) Prior Publication Data

US 2016/0221385 A1    Aug. 4, 2016

(30) Foreign Application Priority Data

Feb. 3, 2015  (DE) .......................... 10 2015 201 837

(51) Int. Cl.
*B60B 3/10* (2006.01)
*B60B 1/06* (2006.01)
*B60B 1/08* (2006.01)

(52) U.S. Cl.
CPC ............... *B60B 3/10* (2013.01); *B60B 1/06* (2013.01); *B60B 1/08* (2013.01); *B60B 2900/131* (2013.01); *B60B 2900/133* (2013.01)

(58) Field of Classification Search
CPC .... B60B 3/10; B60B 3/02; B60B 3/04; B60B 3/00; B60B 1/08; B60B 1/10; B60B 1/14
See application file for complete search history.

(56) References Cited

U.S. PATENT DOCUMENTS

| | | | | |
|---|---|---|---|---|
| 707,335 | A | * | 8/1902 | Kenyon ................ B60B 17/002 295/6 |
| 5,647,642 | A | * | 7/1997 | Word ...................... B60B 3/007 301/5.21 |
| 6,109,701 | A | * | 8/2000 | Budnik .................... B60B 1/08 301/64.102 |
| 7,425,041 | B2 | * | 9/2008 | Passarotto .............. B60B 1/003 301/5.21 |

FOREIGN PATENT DOCUMENTS

| | | |
|---|---|---|
| CN | 102795050 A | 11/2012 |
| DE | 10158408 A1 | 6/2003 |
| JP | 2003306001 A | 10/2003 |
| JP | 2006347476 A | 12/2006 |
| JP | 2006347477 A | 12/2006 |
| JP | 2012040903 A | 3/2012 |

OTHER PUBLICATIONS

Lowes of Larne, BMW 18" Alloys, website, Mar. 2, 2013.

* cited by examiner

*Primary Examiner* — Jason R Bellinger
(74) *Attorney, Agent, or Firm* — Raymond L. Coppiellie; Burgess Law Office, PLLC

(57) ABSTRACT

A wheel for a motor vehicle having a wheel rim connected to a wheel flange via wheel spokes. At least one wheel spoke having a higher mass than at least one of the remaining wheel spokes. The higher mass of the at least one wheel spoke partially compensated for by the lower mass of the at least one remaining wheel spoke.

14 Claims, 5 Drawing Sheets

MOTOR VEHICLE WHEEL

CROSS-REFERENCE TO RELATED APPLICATIONS

Not Applicable

BACKGROUND OF THE INVENTION

1. Field of the Invention

The present invention relates to a motor vehicle wheel; and, more specifically, to a light metal wheel configuration.

2. Description of Related Art

Light metal wheels, cast from light metal alloys—for example aluminum or magnesium alloys, are known. They include a wheel rim that receives a tire and a plurality of wheel spokes connect the wheel rim to a wheel hub. The wheel hub fixes the wheel to the hub of the motor vehicle via wheel bolts. The light metal wheels are loaded during their use with increasing and decreasing dynamic bending and torsional forces. The cross-sections of the wheel spokes need to have dimensions in accordance with these loads. The achievement of a low weight, the compliance with desirable NVH properties (Noise, Vibration, Harshness), and an attractive appearance in such light metal wheels are significant factors.

A light metal wheel having a large number of wheel spokes is generally perceived to be more visually attractive than a wheel having a small number of wheel spokes. However, a large number of wheel spokes results, in comparison with a light metal wheel having the same weight and fewer wheel spokes, in a reduction of the inherent frequency of the light metal wheel and therefore to less favorable NVH properties. A light metal wheel having ten wheel spokes has an inherent frequency lower than a light metal wheel having only five wheel spokes for the same weight. A light metal wheel having a lower inherent frequency may produce undesirable loud noises perceived by the occupants of the motor vehicle. To achieve good NVH properties, the inherent frequency of a light metal wheel should be as high as possible. Furthermore, the cross-sections of the wheel spokes are usually relatively small in light metal wheels having a large number of wheel spokes, which results in an impairment of the wheel rigidity.

SUMMARY OF THE INVENTION

One example of the present invention includes a wheel for a motor vehicle having a hub and a rim. A plurality of wheel spokes extend between and connect the hub to the rim. The wheel spokes are configured such that at least one wheel spoke has a higher mass than at least one of the remaining wheel spokes. The higher mass of the at least one wheel spoke is partially compensated for by a mass reduction of the at least one remaining wheel spoke.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
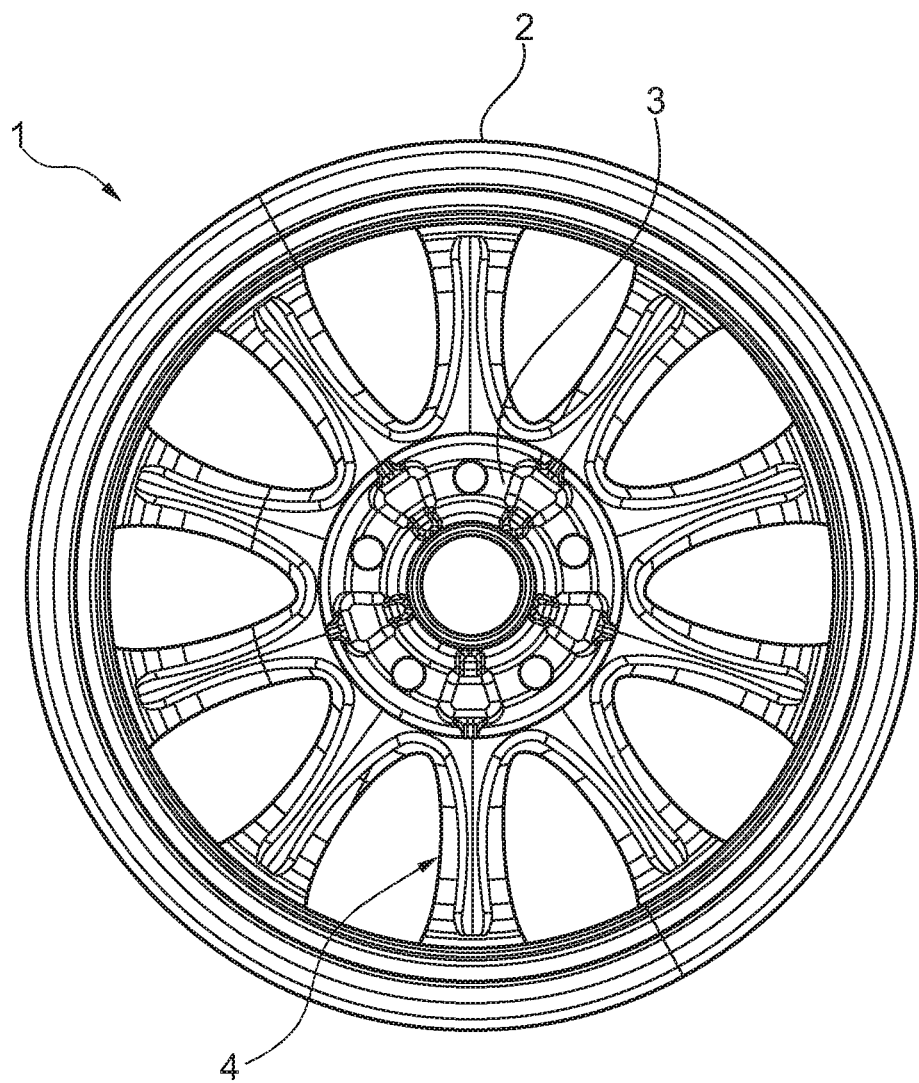
FIG. 1 is an inner view of a light metal wheel according to the prior art.

The following description of the preferred embodiment(s) is merely exemplary in nature and is in no way intended to limit the invention, its application, or uses.

In the different Figures, components having an equivalent function thereof are referred to with the same reference numerals and are generally only described once.

FIG. 1 is a schematic inner view of a light metal wheel 1 according to the prior art. The term light metal generally refers to a lightweight metal, for example aluminum or magnesium, including an alloy or combination thereof. Generally, the inner side of the wheel 1 is, in contrast to the outer side, the side of the wheel 1 facing the motor vehicle in the assembled state. The wheel 1 includes a wheel rim 2 to which the tire, not illustrated in FIG. 1, is secured and a wheel hub flange 3, that attaches the wheel 1 to a hub (not illustrated) of a motor vehicle using of wheel bolts (not illustrated).

The wheel rim 2 is connected to the wheel hub 3 via a plurality of wheel spokes 4. In the embodiment of FIG. 1 ten wheel spokes 4 extend substantially in a radial direction from the wheel hub 3 to the wheel rim 2. As illustrated in FIG. 1 all of the wheel spokes 4 of the wheel 1 have the same configuration and consequently the same mass. In the disclosed example of FIG. 1 the wheel 1 has an inherent frequency of approximately 350 Hz and a total weight of approximately 7.9 kg.

Figure 2:
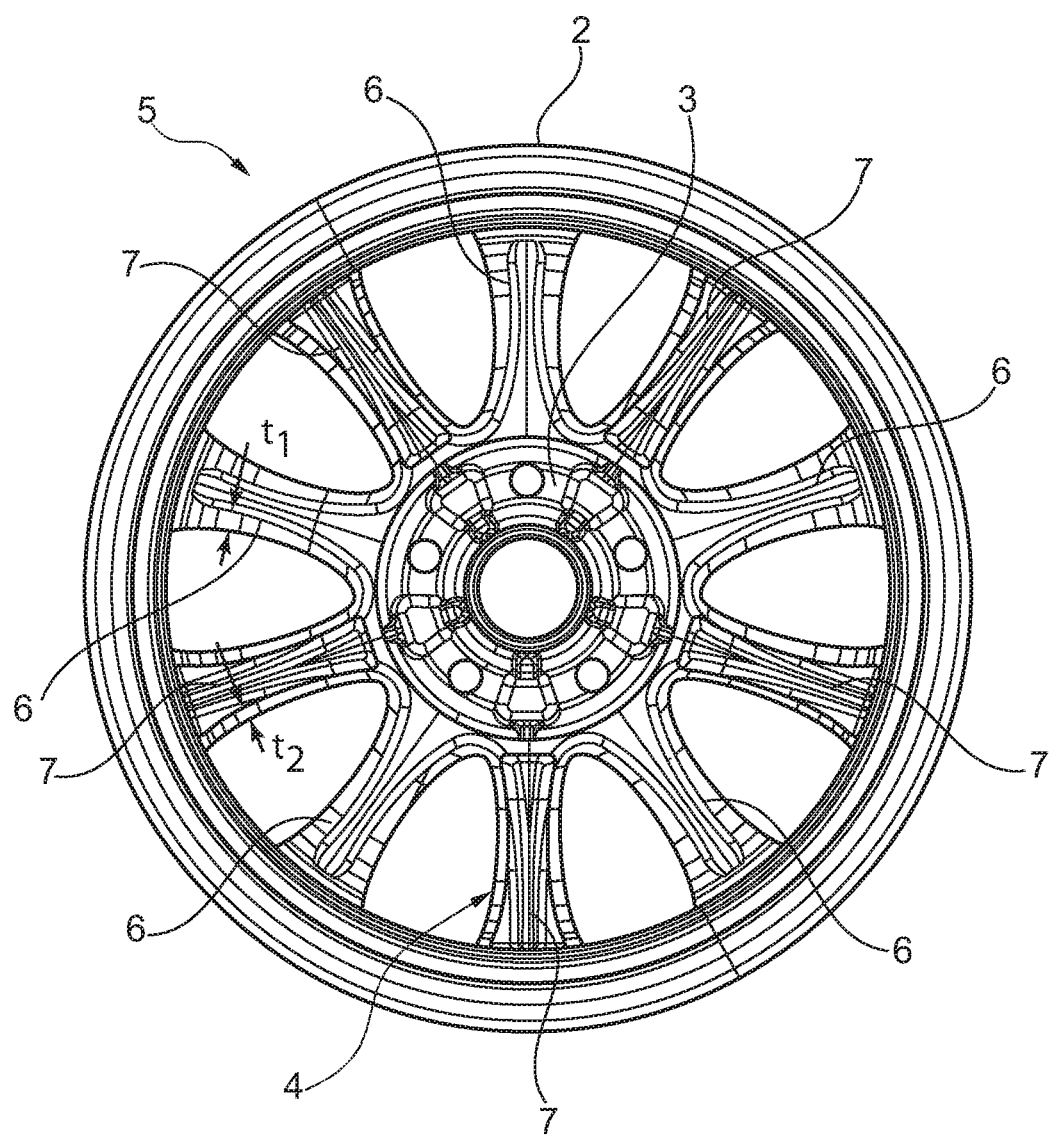
FIG. 2 is an inner view of a first embodiment of a light metal wheel according to the invention.

FIG. 2 illustrates an inner view of a first embodiment of a light metal wheel 5 according to one example of the present invention. As illustrated, the configuration of the wheel spokes 4 of the light metal wheel 5 differs from those of the light metal wheel 1 illustrated in FIG. 1. Specifically, the light metal wheel 5 illustrated in FIG. 2 includes two different configurations or shapes of wheel spokes 4. The embodiment of FIG. 2 illustrates a wheel member having 10 spokes 4. Five wheel spokes 6 have a higher mass compared to the remaining five wheel spokes 7 having a lower mass. Both sets of wheel spokes 6, 7 having a substantially U-shaped cross-section; however, the wheel spokes 6 having a higher mass resulting from a substantially greater wall thickness ($t_1$) than the wall thickness ($t_2$) of the wheel spokes 7 having a lower mass. As seen in FIG. 2, the wheel spokes 6 and 7 are arranged in an alternating manner in a peripheral direction around the wheel hub 3. Furthermore, all the wheel spokes 6 have the same construction and therefore each has the same mass. In the same manner, all the wheel spokes 7 also have the same construction and therefore each has the same mass. This manner produces a completely symmetrical construction of the light metal wheel 5.

As illustrated in FIG. 2, not all of the wheel spokes 4 of the light metal wheel 5 have the same mass. Since at least one wheel spoke 4 has a smaller mass than the remaining wheel spokes 4 the inherent frequency and the rigidity of the light metal wheel 5 are thereby increased. The inherent frequency of the light metal wheel 5 increases because the influence of the at least one wheel spoke 4, having a reduced mass thereof, reduces the inherent frequency of the light metal wheel 5. The light metal wheel 5 according to the disclosed example functions, with regard to the NVH properties thereof, as if it were provided with a lower number of wheel spokes 4, as the number of wheel spokes have a higher mass. Because of the higher mass of the at least one wheel spoke 4, the rigidity thereof increases whereby the light metal wheel 5 according to the invention also increases in rigidity.

As illustrated, the higher mass of the at least one wheel spoke 6 is at least partially compensated for by a mass reduction of the at least one remaining wheel spoke 7. It should be understood that the total mass of the light metal wheel 5 according to the invention advantageously remains substantially the same regarding a conventional light metal wheel 1 in which all the wheel spokes 4 have the same mass. The mass added to the wheel spokes 6 having a higher mass can be removed substantially or at least partially from the wheel spokes 7 having a lower mass so the total weight of the light metal wheel 5 according to the invention differs from a conventional light metal wheel 1 not at all or only slightly.

As illustrated, in FIG. 2, an even number of wheel spokes 4 are provided, wherein a first half of the wheel spokes 6 have a higher mass than the remaining, second half of the wheel spokes 7. In this manner, it is possible to halve the number of the wheel spokes that are substantially effective with regard to the NVH properties of the light metal wheel 5. In other words, the light metal wheel 5 has NVH properties that substantially correspond to a light metal wheel 1 having half the number of wheel spokes 4, that is to say, only those having a higher mass 6, whereby the inherent frequency of the light metal wheel can consequently be increased.

To obtain a symmetrical construction, another advantageous embodiment includes the wheel spokes 6 having a higher mass. For the wheel 5 to have the same mass the wheel spokes 7 must have a lower mass. In addition, the wheel spokes 6 having a higher mass and the wheel spokes having a lower mass 7 are arranged alternately in a peripheral direction of the wheel hub 3. In this manner, the wheel spokes 6 which have a higher mass substantially take up the dynamic loads are distributed uniformly over the light metal wheel 5.

According to one example, all the wheel spokes 6, 7 are configured such that the outer sides, the sides visible on the motor vehicle in the assembled state, are identical resulting in an attractive appearance of the light metal wheel 5. The general visual impression of the light metal wheel 5 is not impaired since the visible outer side of the light metal wheel 5 does not show which wheel spoke has a higher mass and which has a lower mass. If at all, the wheel spokes 6, 7, constructed differently in terms of the mass thereof, may be identified, from the inner side of the light metal wheel 5, because they have different material thicknesses, wall thicknesses, cross-sections and the like.

The light metal wheel 5 illustrated in FIG. 2 has an inherent frequency of approximately 338.7 Hz for a total weight of approximately 7.35 kg. The reduction of the inherent frequency in comparison with the light metal wheel 1 illustrated in FIG. 1 may be explained by the weight reduction of approximately 0.55 kg in comparison with the light metal wheel 1.

Figure 3:
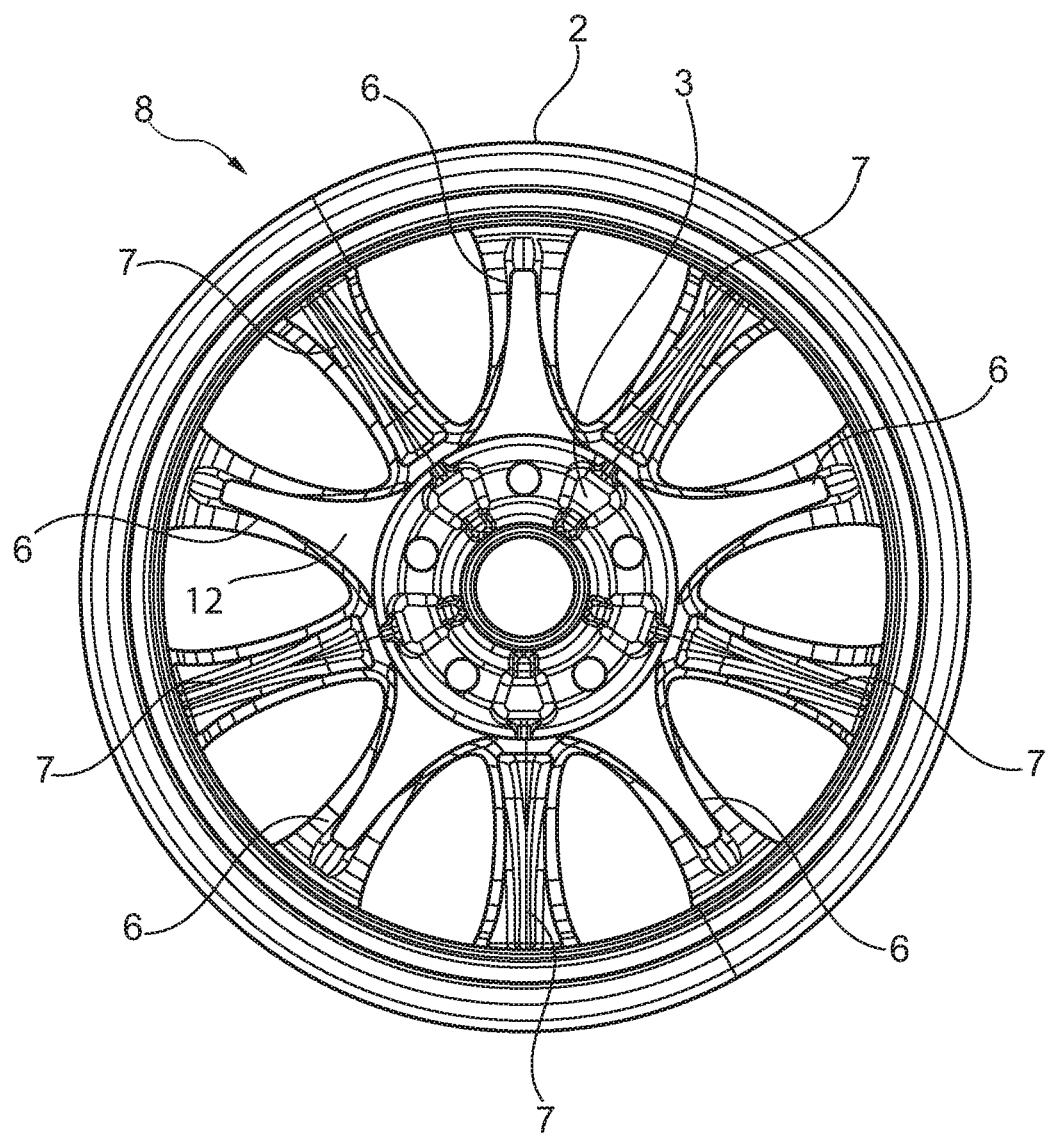
FIG. 3 is an inner view of a second embodiment of a light metal wheel according to the invention.

FIG. 3 illustrates a second embodiment of a light metal wheel 8 according to the invention. As illustrated the light metal wheel 8 has an inherent frequency slightly improved regarding the NVH properties. As shown the substantially U-shaped cross-sectional profile of the wheel spokes 6 having a higher mass includes additional material 12 near the wheel hub 3. The mass of the wheel spokes 6 increases from a radially outer position toward a radially inner position. The inherent frequency of the light metal wheel 8 illustrated in FIG. 3 is approximately 340.4 Hz for a slightly higher total weight than in the light metal wheel 5 illustrated in FIG. 2.

Figure 4:
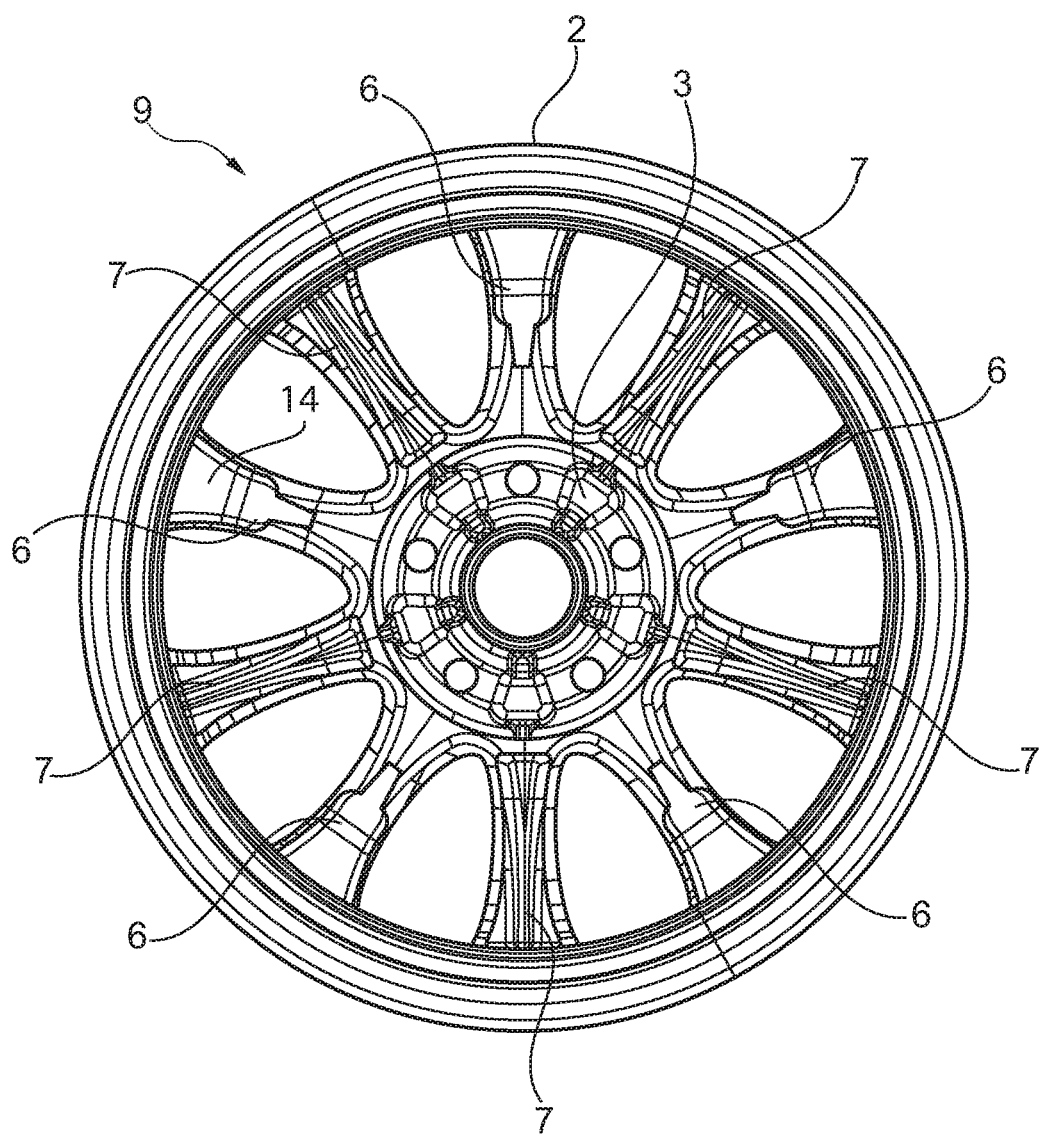
FIG. 4 is an inner view of a third embodiment of a light metal wheel according to the invention.

Another improvement of the inherent frequency is obtained if the mass distribution of the wheel spokes 6 having a higher mass is brought about under the embodiment of a light metal wheel 9 as illustrated in FIG. 4. This mass distribution extends in principle in a manner precisely transposed regarding the mass distribution illustrated in FIG. 3 regarding the wheel spokes 6 having a higher mass. In the light metal wheel 9 illustrated in FIG. 4, the U-shaped cross-sectional profile of the wheel spokes 6 having a higher mass is filled with material 14 near the wheel rim 2. The mass of the wheel spokes 6 increases from a radially inner position toward a radially outer position. The inherent frequency of the light metal wheel 9 is approximately 357.3 Hz.

Figure 5:
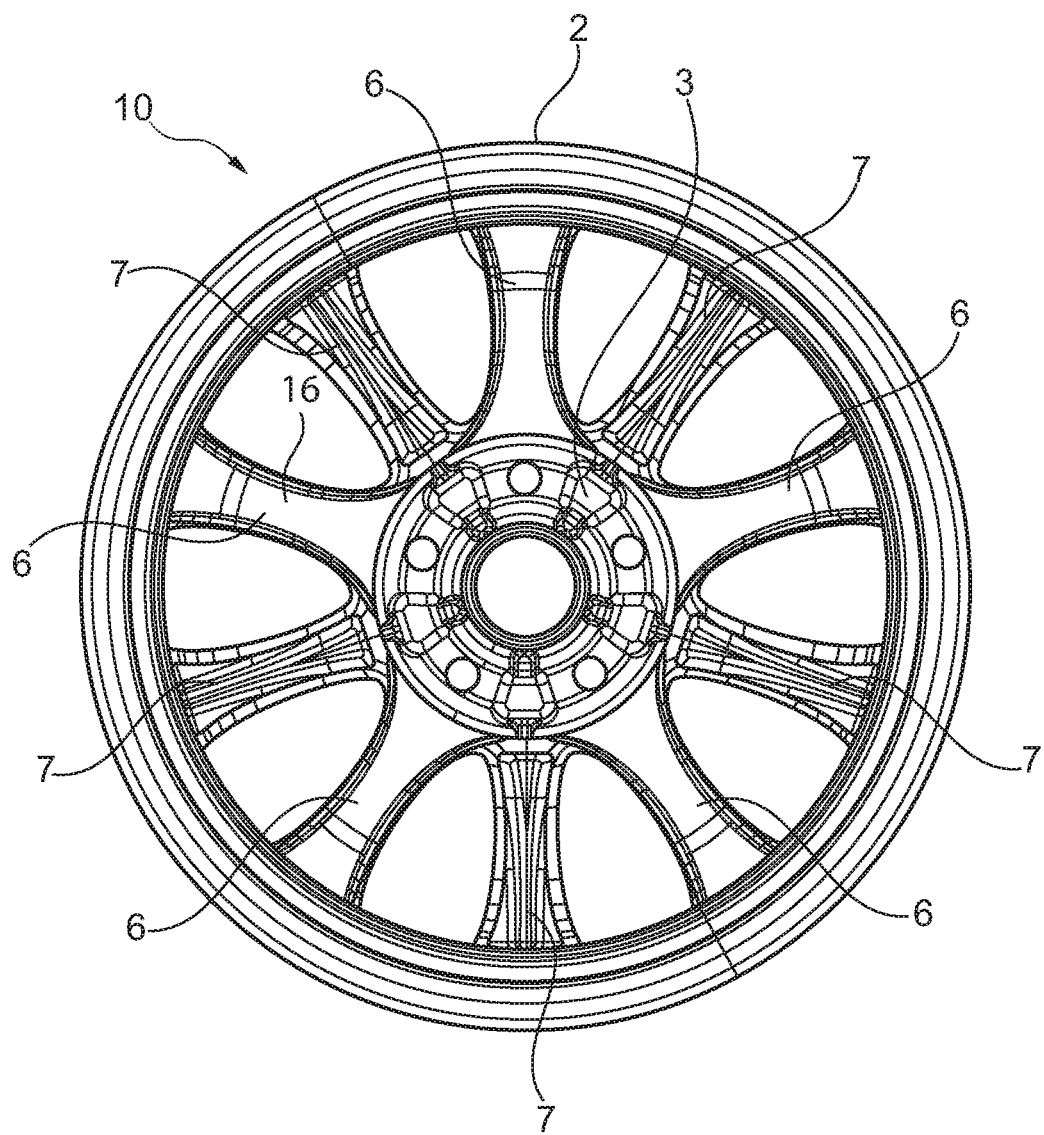
FIG. 5 is an inner view of a fourth embodiment of a light metal wheel according to the invention.

FIG. 5 illustrates another embodiment of a light metal wheel 10 according to the invention. In this embodiment, the original, substantially U-shaped cross-sectional profile of the wheel spokes 6 having a higher mass is filled with material 16, whereas the wheel spokes 7 having a lower mass are constructed in a substantially hollow manner at the illustrated inner side of the light metal wheel 10. In comparison with the light metal wheel 1 according to the prior art as illustrated in FIG. 1, adding material in the wheel spokes 6 having a higher mass is compensated for by the material reduction in the wheel spokes 7 having a lower mass. The inherent frequency of the light metal wheel 10 is approximately 372.8 Hz for a total weight of approximately 7.9 kg. Although the light metal wheel 10 has the same total weight as the light metal wheel 1 of the prior art; the inherent frequency of the light metal wheel 10 is substantially increased regarding the inherent frequency of the light metal wheel 1 with the light metal wheel 10 consequently having substantially better NVH properties.

Although the wheel spokes 6, 7 in the embodiments shown in FIGS. 2 to 5 have a different construction at the inner side of the light metal wheel 5, 8, 9 and 10. It should be understood that the wheel spokes 6, 7 preferably have, at the outer side of the light metal wheel 5, 8, 9, and 10, respectively, an identical construction making it difficult to distinguish them from each other visually. It is thereby possible to obtain an attractive appearance for the light metal wheels 5, 8, 9 and 10, respectively.

The above-described light metal wheels according to the invention are not limited to the embodiments disclosed herein, but instead also include additional embodiments which have the same effect.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A wheel for a motor vehicle comprising:
a hub and a rim;
wheel spokes connecting said hub to said rim;
at least one wheel spoke has a higher mass than at least one of the remaining wheel spokes, wherein the higher mass of the at least one wheel spoke is compensated for by a mass reduction of the at least one remaining wheel spoke; and an even number of wheel spokes, wherein half of the wheel spokes have a higher mass than the remaining wheel spokes.

2. The wheel of claim 1 wherein the wheel spokes having a higher mass each have the same mass and the wheel spokes having a lower mass each have the same mass.

3. The wheel of claim 1 wherein the wheel spokes having a higher mass and the wheel spokes having a lower mass are arranged alternately in a circumferential direction of the wheel hub.

4. The wheel of claim 1 wherein all the wheel spokes have a substantially same configuration when viewed from an outer side of said wheel spokes.

5. The wheel of claim 1 wherein the at least one wheel spoke having a higher mass has a cross section having a greater wall thickness than a wall thickness of at least one of the remaining wheel spokes.

6. The wheel of claim 1 wherein all of said wheel spokes have a cross-sectional profile including a wall; and
said wheel spokes having a higher mass having a greater wall thickness than said remaining wheel spokes.

7. The wheel of claim 1 wherein said wheel spokes having a higher mass include increased material located adjacent said hub.

8. The wheel of claim 1 wherein said wheel spokes having a higher mass include increased material located adjacent rim.

9. The wheel of claim 1 wherein said wheel spokes having a higher mass include increased material extending between said hub and said rim.

10. The wheel of claim 6 wherein the wheel spokes having a higher mass each have the same mass and the wheel spokes having a lower mass each have the same mass.

11. A wheel for a motor vehicle comprising:
a hub and a rim;
wheel spokes connecting said hub to said rim; and
an even number of wheel spokes wherein half of the wheel spokes have a higher mass than the remaining wheel spokes, with the wheel spokes having a higher mass each having the same mass and the wheel spokes having a lower mass each having the same mass; and
wherein the higher mass of half of the wheel spokes is partially compensated for by a mass reduction of the remaining wheel spokes.

12. The wheel of claim 11 wherein the wheel spokes having a higher mass and the wheel spokes having a lower mass are arranged alternately in a circumferential direction of the wheel hub.

13. The wheel of claim 11 wherein all of said wheel spokes have a cross-sectional profile including a wall; and
said wheel spokes having a higher mass having a greater wall thickness than said remaining wheel spokes.

14. The wheel of claim 13 wherein the wheel spokes having a higher mass and the wheel spokes having a lower mass are arranged alternately in a circumferential direction of the wheel hub.

* * * * *

UNITED STATES PATENT AND TRADEMARK OFFICE
CERTIFICATE OF CORRECTION

Page 1 of 1

PATENT NO. : 10,252,569 B2
APPLICATION NO. : 15/011514
DATED : April 9, 2019
INVENTOR(S) : Bassam Noweihed It is certified that error appears in the above-identified patent and that said Letters Patent is hereby corrected as shown below:

In the Specification

Column 2, Line 29, "flange" should be deleted.

Column 6, Line 16, "partially" should be deleted.

Signed and Sealed this
Tenth Day of September, 2019

Andrei Iancu
*Director of the United States Patent and Trademark Office*